US 9,253,071 B2

(12) United States Patent
Schwenk et al.

(10) Patent No.: US 9,253,071 B2
(45) Date of Patent: Feb. 2, 2016

(54) METHODS, SYSTEMS, AND COMPUTER READABLE MEDIA FOR TEST CONFIGURATION OPTIMIZED DECODING OF PROTOCOL MESSAGES IN A NETWORK DEVICE TEST SYSTEM

(71) Applicant: Ixia, Calabasas, CA (US)

(72) Inventors: Alan Richard Schwenk, Raleigh, NC (US); Avinash Raj Nambi Raj, Cary, NC (US)

(73) Assignee: Ixia, Calabasas, CA (US)

( * ) Notice: Subject to any disclaimer, the term of this patent is extended or adjusted under 35 U.S.C. 154(b) by 174 days.

(21) Appl. No.: 14/027,113

(22) Filed: Sep. 13, 2013

(65) Prior Publication Data
US 2015/0082103 A1 Mar. 19, 2015

(51) Int. Cl.
H04L 12/26 (2006.01)
(52) U.S. Cl.
CPC ..................... *H04L 43/50* (2013.01)
(58) Field of Classification Search
CPC .. H04W 24/02; H04W 36/245; G01S 5/0252; H04L 67/18; H04L 41/145; H04L 43/50; G06F 3/01; G06F 13/12; G05B 23/0283
USPC ........................... 714/701, 795, 799
See application file for complete search history.

(56) References Cited

U.S. PATENT DOCUMENTS

| | | | |
|---|---|---|---|
| 5,655,079 A * | 8/1997 | Hirasawa et al. | 709/245 |
| 5,850,386 A | 12/1998 | Anderson et al. | |
| 6,159,724 A * | 12/2000 | Ehret | 435/252.1 |
| 6,665,357 B1 * | 12/2003 | Somayazulu | 375/341 |
| 6,724,883 B1 * | 4/2004 | Lehtinen | 379/230 |
| 6,996,772 B2 | 2/2006 | Justice et al. | |
| 7,543,054 B1 | 6/2009 | Bansod et al. | |
| 7,765,313 B2 | 7/2010 | Jain et al. | |
| 8,601,585 B2 | 12/2013 | Beddoe et al. | |
| 8,792,875 B2 * | 7/2014 | Dhanda et al. | 455/419 |
| 8,908,535 B2 * | 12/2014 | Campbell et al. | 370/242 |
| 9,131,000 B2 | 9/2015 | Iyer | |
| 2012/0063354 A1 * | 3/2012 | Vanga et al. | 370/254 |
| 2013/0060735 A1 | 3/2013 | Haddy et al. | |
| 2013/0275606 A1 | 10/2013 | Iyer | |
| 2013/0308700 A1 * | 11/2013 | Koike-Akino et al. | 375/240.07 |
| 2015/0046141 A1 * | 2/2015 | Lahiri et al. | 703/13 |

OTHER PUBLICATIONS

Applicant Initatied Interview Summary for U.S. Appl. No. 13/447,160 (Mar. 26, 2015).
Advisory Action for U.S. Appl. No. 13/447,160 (Mar. 5, 2015).

(Continued)

*Primary Examiner* — Phung M Chung
(74) *Attorney, Agent, or Firm* — Jenkins, Wilson, Taylor & Hunt, P.A.

(57) ABSTRACT

A network equipment device test system includes a message blueprint data structure for storing blueprint data for messages to be decoded. The network equipment test device further includes a message decoder for decoding received messages by accessing the message blueprint data structure and matching information elements in the received messages with information elements in the message blueprint data structure. The network equipment test device further includes a message blueprint data structure configurator for receiving, as input, test configuration data, and for configuring the message blueprint data structure for optimized decoding of messages based on the test configuration data.

19 Claims, 7 Drawing Sheets

(56) References Cited

OTHER PUBLICATIONS

Final Office Action for U.S. Appl. No. 13/447,160 (Dec. 19, 2014).
Non-Final Office Action for U.S. Appl. No. 13/447,160 (Jul. 10, 2014).
Advisory Action for U.S. Appl. No. 13/447,160 (May 29, 2014).
Applicant-Initiated Interview Summary for U.S. Appl. No. 13/447,160 (May 23, 2014).
Dutta et al., "A Tight Lower Bound for Parity in Noisy Communcations Networks," Tata Institute of Fundamental Research, pp. 1056-1065, (2008).
Sleator et al., "Self-Adjusting Binary Search Trees," Journal of the Association for Computing Machinery. vol. 32, No. 3, pp. 652-686 (Jul. 1985).
Final Office Action for U.S. Appl. No. 13/447,160 (Mar. 18, 2014).
Applicant-Initiated Interview Summary for U.S. Appl. No. 13/447,160 (Feb. 25, 2014).
Non-Final Office Action for U.S. Appl. No. 13/447,160 (Nov. 8, 2013).

"3rd Generation Partnership Project; Technical Specification Group Radio Access Network; Envolved Universal Terrestrial Radio Access (E-UTRA); Physical Channels and Modulation (Release 10)," 3GPP TS 36.211, V10.3.0 (Sep. 2011).
"3rd Generation Partnership Project; Technical Specification Group Radio Access Network; Envolved Universal Terrestrial Radio Access (E-UTRA); LTE Physcial Layer; General Description (Release 10)," 3GPP TS 36.201, V10.0.0 (Dec. 2010).
Abbes et al., "Protocol Analysis in Intrusion Detection Using Decision Tree," IEEE, Proceedings of the International Conference on Information Technology: Coding and Computing (ITCC'04), pp. 1-5 (2004).
Notice of Allowance and Fee(s) Due for U.S. Appl. No. 13/447,160 (Apr. 30, 2015).
Nilsson et al., "The Scalable Tree Protocol—A Cache Coherence Approach for Large-Scale Multiprocessors," IEEE, pp. 498-506 (1992).

\* cited by examiner

METHODS, SYSTEMS, AND COMPUTER READABLE MEDIA FOR TEST CONFIGURATION OPTIMIZED DECODING OF PROTOCOL MESSAGES IN A NETWORK DEVICE TEST SYSTEM

TECHNICAL FIELD

The subject matter described herein relates to the decoding of protocol messages by a network device test system. More particularly, the subject matter described herein relates to methods, systems, and computer readable media for test configuration optimized decoding of protocol messages in a network device test system.

BACKGROUND

A network device test system sends protocol messages to a device under test and receives responsive messages from the device under test to test the functionality and performance of the device under test. In order to properly evaluate the functionality and performance of the device under test, the network device test system must decode the response messages to determine what information elements are included in the messages. The decoding of response messages is one of the most processor intensive operations performed by a network device test system. For example, in some network device test systems, decoding is performed by sequentially accessing elements in a data structure and comparing the elements to bits of a received message until a matching element is located. Each access to the data structure and each comparison consumes processor cycles. Thus, it is desirable to limit the number of data structure accesses and comparisons performed during message decoding.

Accordingly, there exists a long felt need for methods, systems, and computer readable media for test configuration optimized decoding of protocol messages in a network device test system.

SUMMARY

Methods, systems, and computer readable media for test configuration optimized decoding of protocol messages in a network device test system are provided. One exemplary network equipment device test system includes a message blueprint data structure for storing blueprint data for messages to be decoded. The network equipment test device further includes a message decoder for decoding received messages by accessing the message blueprint data structure and matching information elements in the received messages with information elements in the message blueprint data structure. The network equipment test device further includes a message blueprint data structure configurator for receiving, as input, test configuration data, and for configuring the message blueprint data structure for optimized decoding of messages based on the test configuration data.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

Figure 1:
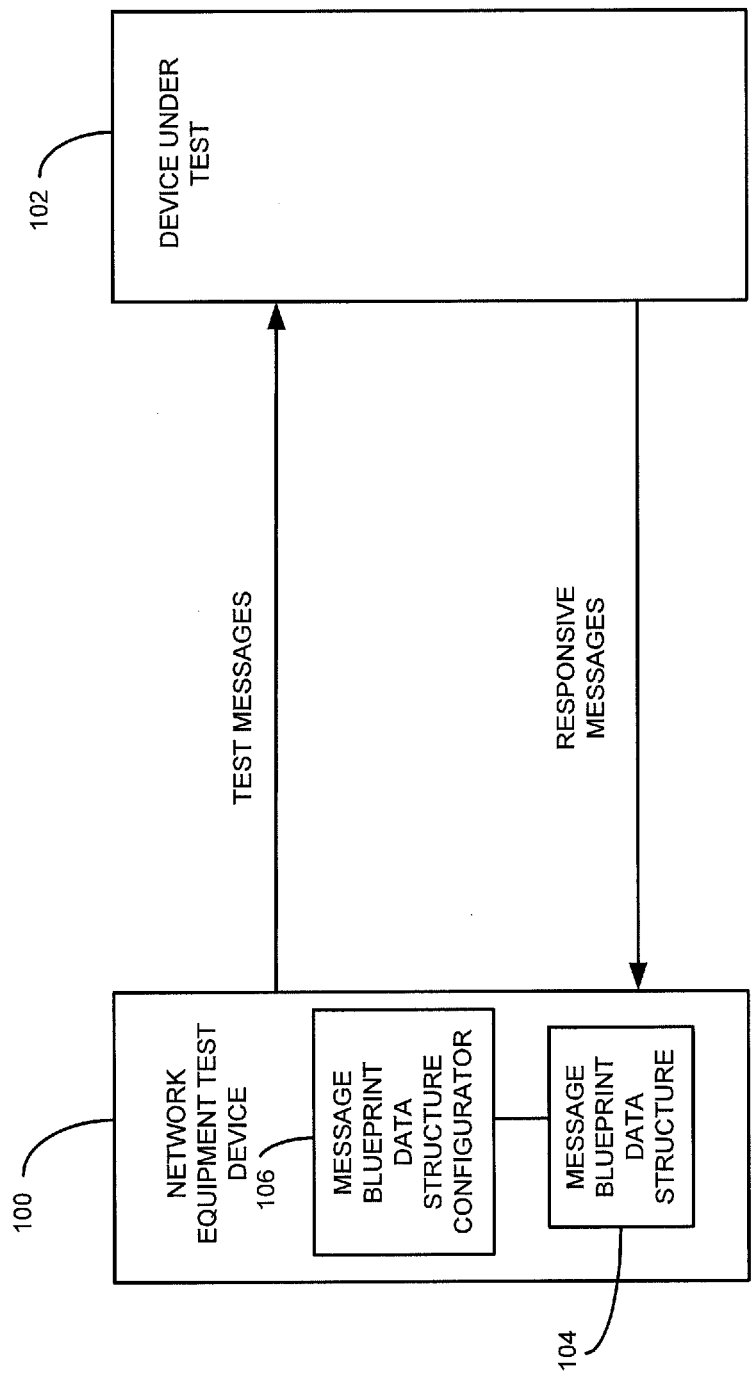
FIG. 1 is a block diagram illustrating an exemplary network device test system and a device under test according to an embodiment of the subject matter described herein.

The subject matter described herein includes network test configuration optimized decoding of protocol messages that may be implemented in a network device test system. FIG. 1 is a block diagram illustrating a network equipment test device for sending test messages to a device under test according to an embodiment of the subject matter described herein. Referring to FIG. 1, network equipment test device 100 may generate and send simulated network traffic to device under test 102. The simulated network traffic may be data traffic, signaling traffic, voice traffic, or any packetized data that is used to test the functionality of a device under test. Device under test 102 receives the traffic, processes the traffic, and sends responsive traffic back to network equipment test device 100. Network equipment test device 100 may decode the received traffic to verify the functionality and performance of device under test 102 and to determine how to properly respond to the received traffic.

In one exemplary embodiment, the device under test 102 may be a long term evolution (LTE) access node, such as an evolved Node B (e-Node B), and network equipment test device 100 may be an LTE user equipment (UE) simulator that simulates one or more UEs. As an LTE UE simulator, network equipment test device 100 may generate and send uplink traffic to DUT 102 and may receive and process downlink traffic from DUT 102. The decoding of downlink traffic may be performed more efficiently using test-configuration-optimized decoding, as described herein.

Because message decoding is processor intensive, network equipment test device 100 may include a message blueprint data structure 104 that stores message blueprint data that is optimized based on test configuration data. As used herein, a message blueprint is a sequence of nodes in the message blueprint data structure usable to decode a sequence of information elements expected to be present in a received message. The message blueprint data structure may include sequences of nodes for decoding many different message types. Network equipment test device 100 may further include a message blueprint data structure configurator 106 for optimizing message blueprint data structure 104 for efficient decoding of protocol messages based on knowledge of test configuration and/or changing conditions during the test.

Figure 2:
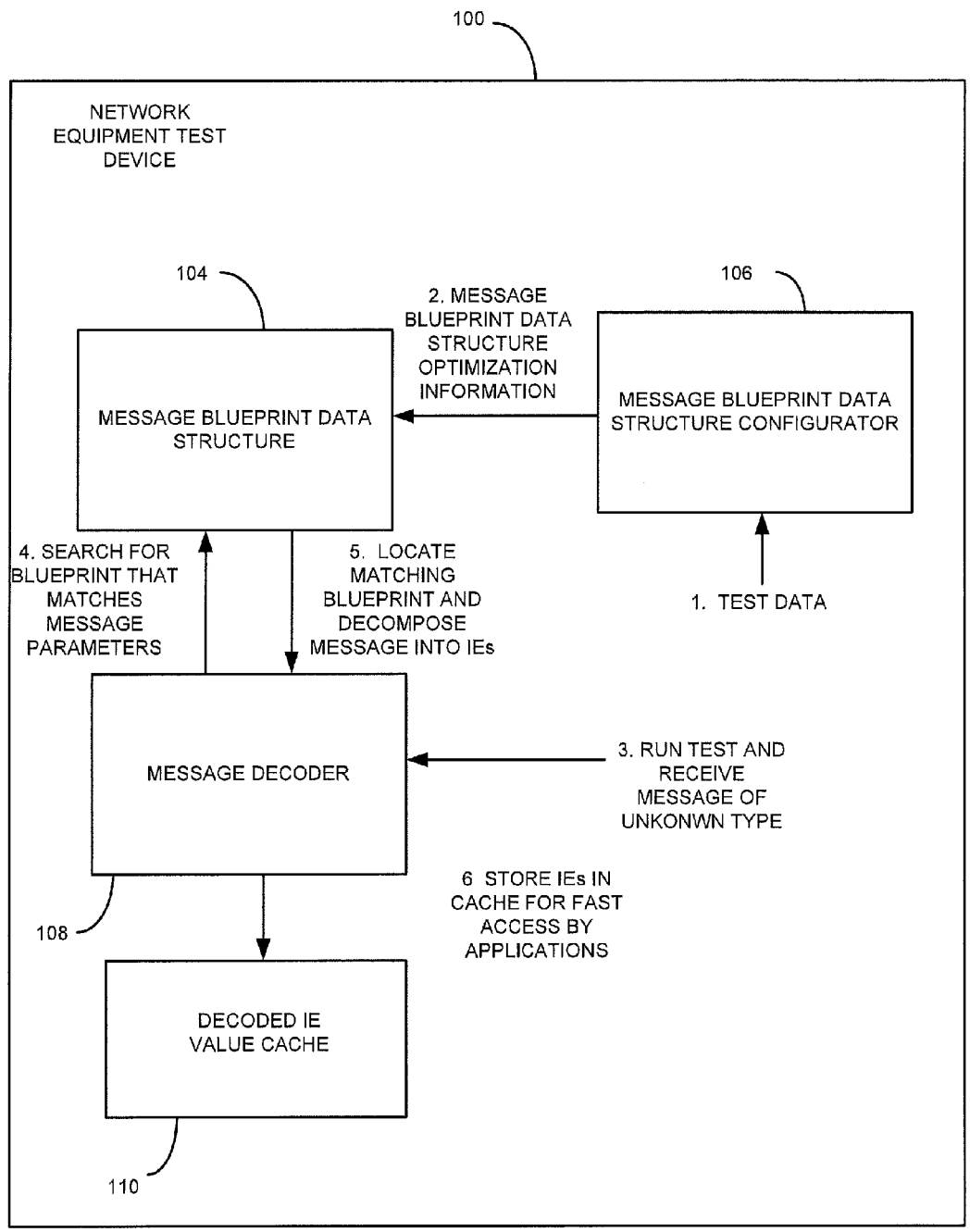
FIG. 2 is a block diagram illustrating an exemplary message decoding architecture for a network device test system according to an embodiment of the subject matter described herein.

FIG. 2 is a block diagram illustrating the decoding of messages by network equipment test device 100 in more detail. In FIG. 2, configurator 106 receives test configuration data as input. The test configuration data may indicate the number and sequence of messages used in a test. Configurator 106 may optimize message blueprint data structure 104 based on the test configuration data. For example, if the test is known to have 30 messages of one type and no more than 10 messages of any other type, the message blueprint data structure will be re-ordered so that nodes for decoding the most frequently occurring message are accessed first during decoding of messages of unknown type. In addition to or instead of reordering message blueprint data, message blueprint data structure configurator 106 may create a cache of information elements known to be present in a particular test so that sequential access to elements within data structure 104 to locate specific elements is not required. In another example, message blueprint structure 104 may be dynamically re-ordered during a test based on expected changes in the message distributions during the test. For example, in one test, it may be known that 20 UEs will attach to the network and later detach. During the attachment phase of the test, the message blueprint data structure may be optimized to decode attachment messages. After the attachment phase, the message blueprint data structure may be dynamically re-ordered to decode detachment related messages.

In the message flow illustrated in FIG. 2, once message blueprint data structure 104 is optimized using the test configuration data in step 2, the test is executed in step 3 and a message of unknown type is received. In step 4, message decoder 108 accesses message blueprint data structure 104 to determine the message type and the information elements that are present in the message. In step 5, message decoder 108 identifies the message type by identifying the proper blueprint and decodes the information elements in the message using the blueprint. In step 6, message decoder 108 stores the values for the information elements decoded from the message in a decoded information element value cache 110 for fast access by applications.

Figure 3:
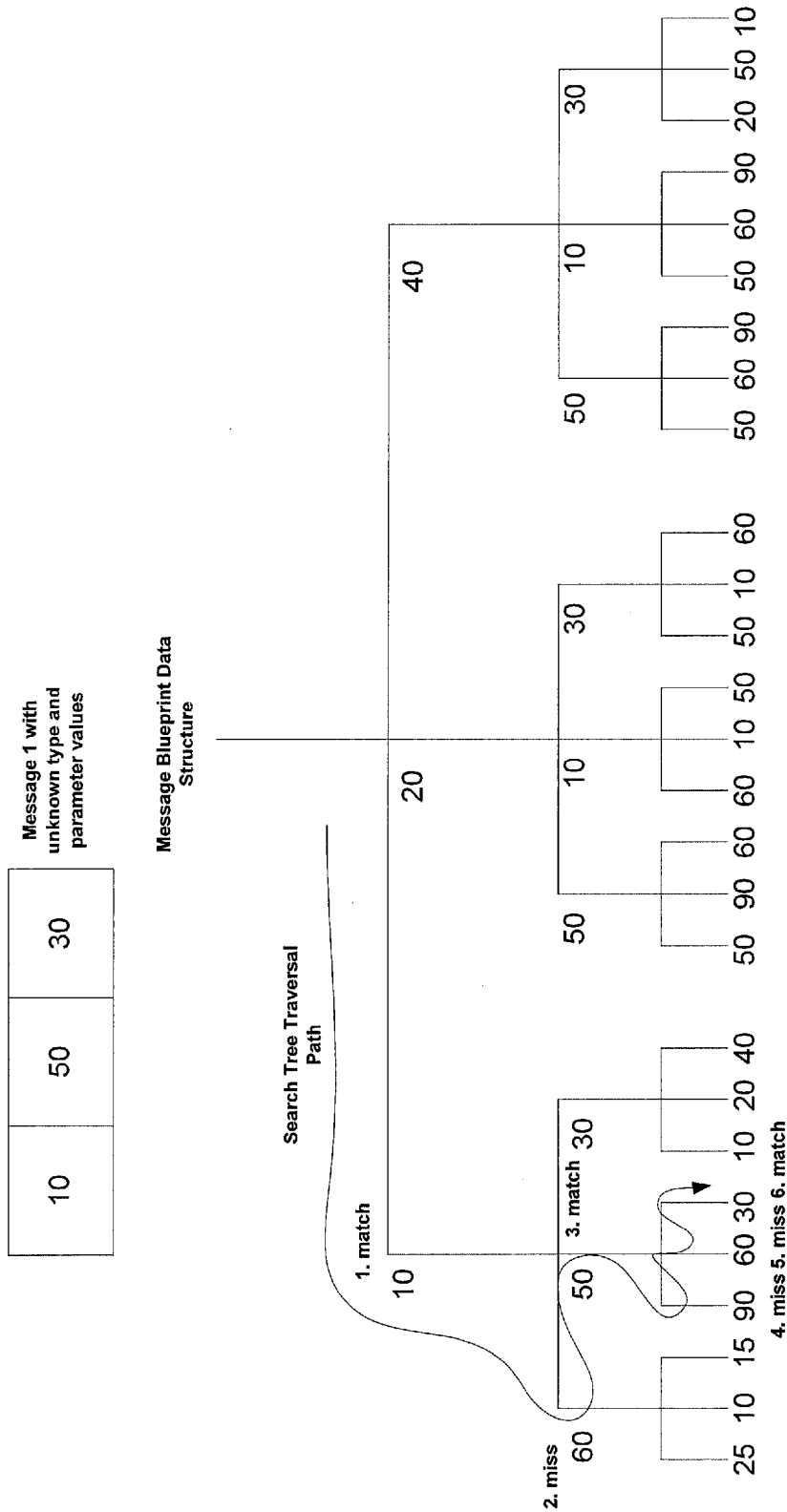
FIG. 3 is a tree diagram illustrating traversal of a message blueprint data structure prior to message blueprint data structure optimization according to an embodiment of the subject matter described herein.

FIG. 3 schematically illustrates the traversal of an unoptimized message blueprint data structure that may be performed by message decoder 108. In FIG. 3, a message 1 with information elements 10, 50, and 30 is received. As used herein, an "information element" is a portion of a message defined by a protocol. For example, in LTE networks a radio resource control (RRC) connection request message is sent from the UE to the eNode-B to initiate connection establishment. One information element that may be included in such a message is a message type information element that identifies the message as an RRC connection request message. The RRC message may also include other information elements, some mandatory and some optional, that store parameters of the RRC connection request message. A message blueprint represents a collection of information elements that make up a protocol message, such as an RRC connection request.

Figure 4:
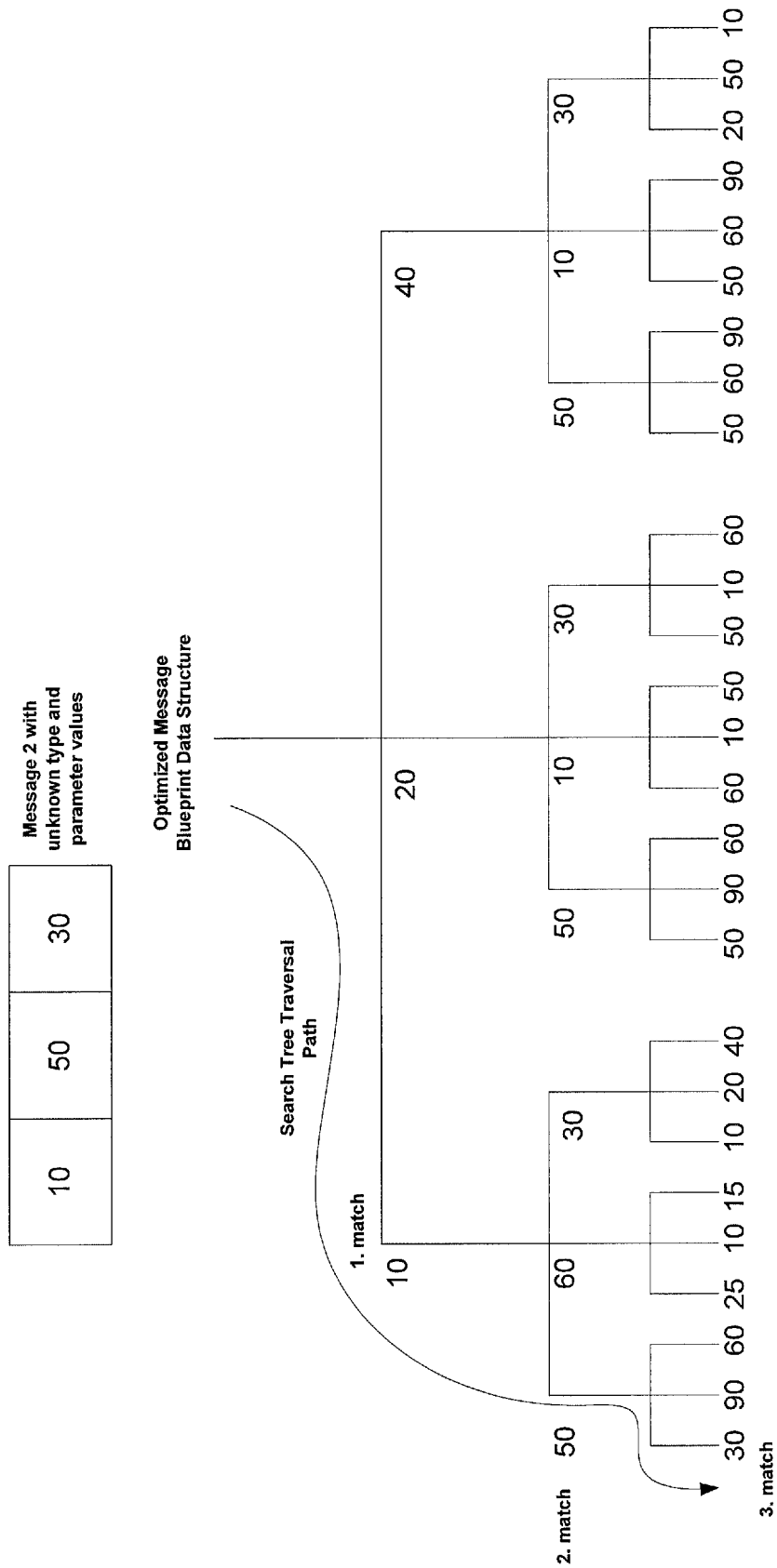
FIG. 4 is a tree diagram illustrating traversal of a message blueprint data structure after message blueprint data structure optimization according to an embodiment of the subject matter described herein.
Figure 5:
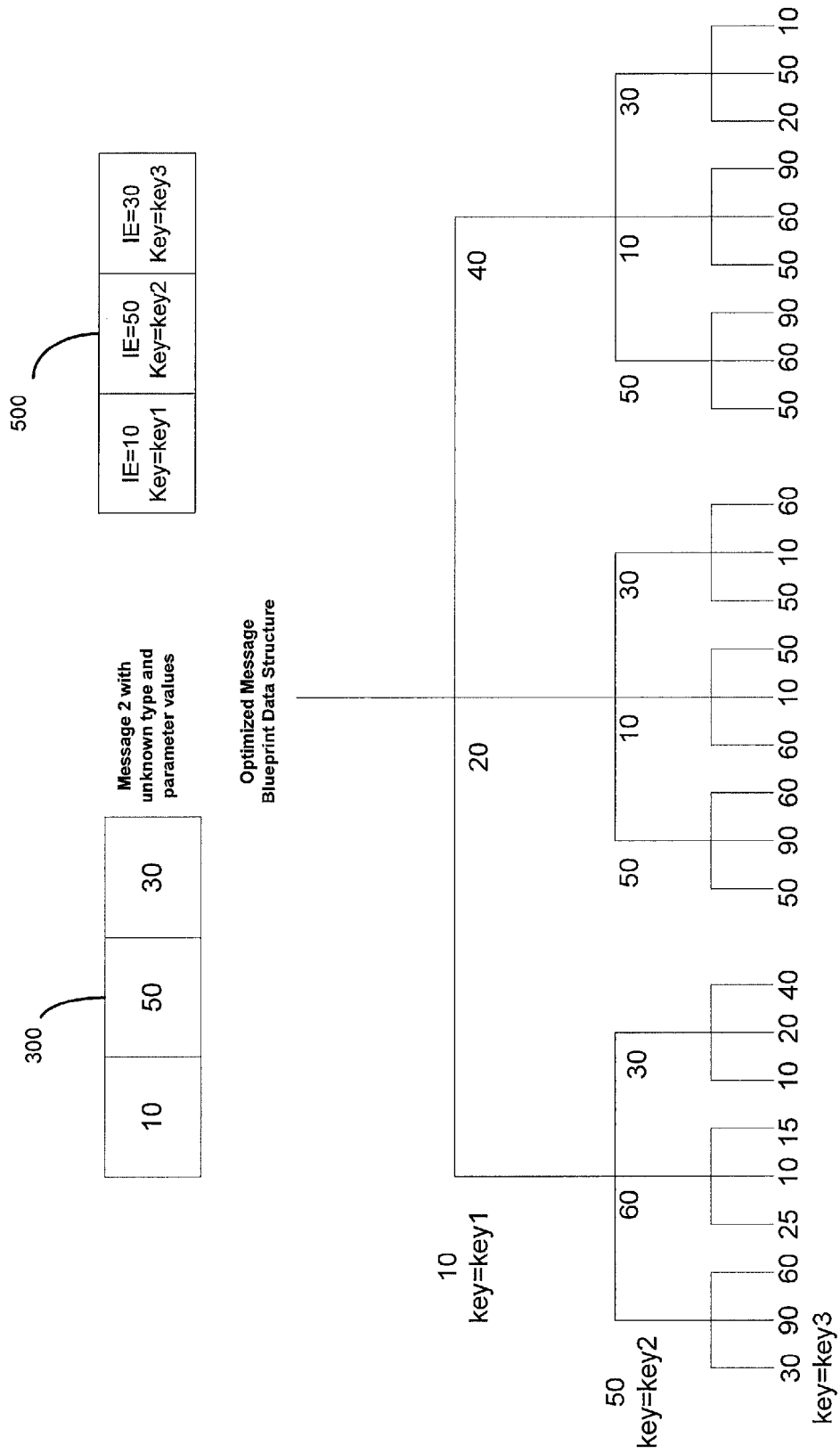
FIG. 5 is a tree diagram and a message information element cache generated based on test configuration data according to an embodiment of the subject matter described herein.

In FIGS. 3-5, the message blueprint data structure is represented as a tree structure, which each branch from root node to leaf node corresponding to a message blueprint. Traversal of the tree in the message decoding examples described below is from root to leaf, proceeding from the leftmost path to the rightmost path. Each blueprint contains a series of values corresponding to the IEs in a particular message. For example, an RRC message blueprint may contain a first value identifying the message as an RRC message followed by other IEs that typically occur in an RRC message. Thus, for the leftmost branch in the tree in FIG. 3, the values 10, 60, 25 may represent an RRC message (identified by message type value 10) with two additional information elements (identified by IEs 10 and 25).

The message examples illustrated in FIGS. 3-5 are simplified in that each IE includes a single value. It is understood that an IE in most message protocols consists of three parameters: a type, a length, and a value. To decode an IE, it is necessary to find a parameter value in the message blueprint data structure that matches the parameter type portion of the IE. Once the parameter type is determined, decoding the IE includes extracting the value from the value portion of the IE. The decoding process may be repeated for each IE present in a received message.

Although in the examples illustrated in FIGS. 3-5, the message blueprint data structure is represented as a tree, the subject matter described herein is not limited to configuring or accessing message blueprint data in a tree structure. Any structure in which nodes corresponding to message information elements are accessed in an order (such as a sequential order) that can be arranged or configured for optimized decoding based on test configuration data is intended to be within the scope of the subject matter described herein.

In the message decoding example illustrated in FIG. 3, the first IE in the received message to be decoded has a value of 10. Accordingly, decoder 108 accesses message blueprint data structure 104 by traversing the leftmost branch and locates a match in the first level of the tree after the root node. Accordingly, decoder 108 then proceeds from the matching node in the first level in the tree to the portion of the second level of the tree branching from the matching node in the first level and searches that portion for the IE parameter value of 50 extracted from the received message. The first comparison at the second level of the tree results in a miss because the value of the leftmost node in the second level is 60. Decoder 108 then compares the received IE value of 50 with the IE value stored in the next node in the second level of the tree. The comparison with the value in the second node results in a match because the node has an IE value of 50.

After locating a match in the second level of the tree, decoder 108 proceeds from the matching node in the second level to the portion of the third level of the tree that branches from the matching node in the second level. Decoder 108 then sequentially compares the IE 30 from the received message to the IE values of 90, 60, and 30 stored in the portion of the third level branching from the matching node in the second level. In this example, the third comparison results in a match. Once all of the IEs in a received message have been decoded, the corresponding values may be extracted from the message and stored in a cache for access by applications.

In the example illustrated in FIG. 3, 6 total comparisons were required to identify the proper message blueprint and decode the received message. The number of comparisons required to decode a received message may be reduced by optimizing the message blueprint data structure based on test configuration data. FIG. 4 is a schematic diagram illustrating a test configuration data optimized version of the blueprint data structure 104 illustrated in FIG. 3. In FIG. 4, the data structure is optimized such that messages with IE parameter values 10, 50, 30 are positioned in the leftmost branch of the tree. Such optimization may be performed by configurator 106 in advance of the test based on test configuration data that is either automatically accessed and used by configurator 106 to rearrange message blueprint data in data structure 104 or that is displayed to a user by configurator 106 and utilized by the user to rearrange message blueprint data.

Continuing with the same message type illustrated in FIG. 3, when a message with IE values 10, 50, 30 is received, three comparisons are required and no misses occur to fully decode the message. No monitoring is required during the test to optimize the message blueprint data structure because the test administrator and/or configurator 106 uses advance knowledge of the test configuration to reconfigure the message blueprint data structure.

The lte_primitive_list structure shown below is an example of an initial configuration of message blueprint data structure that may be used in decoding messages for a particular test. Each element in the structure corresponds to a message information element or a combination of message information elements for decoding a protocol message of a particular type. For example, the lte_Data_Req_UE element may correspond to a message information element or a combination of message elements for decoding long term evolution (LTE) UE data request messages. Traversing message blueprint data structure may be implemented by a function call by message decoder 108 with one of the message elements in the lte_primitive_list structure as an input parameter to the function call.

The order of the elements in the lte_primitive_list structure corresponds to the order in which message information elements will be accessed when attempting to decode a received message. In the lte_primitive_list structure, ten different message types are indicated. If a received protocol message corresponds to the last type in the structure (lte_Data_Ack), ten function calls and ten accesses to the data structure would be required before the message is decoded properly.

```
struct IE *rrcpdcpprim_r9_lte_primitive_list[10] = {
    /* LOCAL IE */ rrcpdcpprim_r9_lte_Data_Req_UE,
    /* LOCAL IE */ rrcpdcpprim_r9_lte_Data_Req_UE_SM,
    /* LOCAL IE */ rrcpdcpprim_r9_lte_Data_Req_eNB,
    /* LOCAL IE */ rrcpdcpprim_r9_lte_Data_Req_eNB_SM,
```
-continued
```
    /* LOCAL IE */ rrcpdcpprim_r9_lte_Data_Ind_UE,
    /* LOCAL IE */ rrcpdcpprim_r9_lte_Data_Ind_UE_SM,
    /* LOCAL IE */ rrcpdcpprim_r9_lte_Data_Ind_eNB,
    /* LOCAL IE */ rrcpdcpprim_r9_lte_Data_Ind_eNB_SM,
    /* LOCAL IE */ rrcpdcpprim_r9_lte_Sec_Mode_Status,
    /* LOCAL IE */ rrcpdcpprim_r9_lte_Data_Ack,
};
```

In order to reduce unnecessary function calls and accesses to the data structure, the elements in the data structure may be rearranged in advance of conducting a test based on known test configuration data. For example, a given test may implement a call flow that includes two lte_Data_Ind_eNB messages, three lte_Sec_Mode_Status messages, and one lte_Data_Ind_eNB_SM messages. Because this information is known in advance by the test administrator, the elements in the data structure listed above may be reordered to form the following optimized message blueprint data structure.

```
struct IE *rrcpdcpprim_r9_lte_primitive_list[10] = {
    /* LOCAL IE */ rrcpdcpprim_r9_lte_Sec_Mode_Status,   // Priority 0 (3 times in the call flow)
    /* LOCAL IE */ rrcpdcpprim_r9_lte_Data_Ind_eNB,      // Priority 1 (2 times in the call flow)
    /* LOCAL IE */ rrcpdcpprim_r9_lte_Data_Ind_eNB_SM,   // Priority 2 (1 time in the call flow)
    /* LOCAL IE */ rrcpdcpprim_r9_lte_Data_Req_UE,
    /* LOCAL IE */ rrcpdcpprim_r9_lte_Data_Req_UE_SM,
    /* LOCAL IE */ rrcpdcpprim_r9_lte_Data_Req_eNB,
    /* LOCAL IE */ rrcpdcpprim_r9_lte_Data_Req_eNB_SM,
    /* LOCAL IE */ rrcpdcpprim_r9_lte_Data_Ind_UE,
    /* LOCAL IE */ rrcpdcpprim_r9_lte_Data_Ind_UE_SM,
    /* LOCAL IE */ rrcpdcpprim_r9_lte_Data_Ack,
};
```

In the optimized data structure, the most frequently occurring message IE in the test (lte_Sec_Mode_Status), followed by the next most frequently occurring message IE (lte_Data_Ind_eNodeB), followed by the third most frequently occurring message IE (lte_Data_Ind_eNodeB_SM). Because of the reordering of the IEs in the message blueprint data structure based on the relative frequency of occurrence of message IEs in test, decoding during the test will require fewer function calls and fewer accesses to the data structure than the test would require if the message blueprints were not reordered.

In addition to or instead of reordering message IEs in the message blueprint data structure based on test configuration data, configurator 106 may use test configuration data to derive keys for each node known to be present in a test and store the keys in a cache at the root node of data structure 104 for faster lookup. As used herein, a key refers to a value that is used to access a node in the message blueprint data structure without requiring tree traversal and comparison. Referring to FIG. 5, a unique key value may be associated with each node in the tree. The key values may be cached or stored in a cache 500 that stores key value for each possible IE value in the data structure. Accordingly, when message 300 is received, rather than traversing the data structure, key values for each IE are extracted from cache 500 and used to directly access the corresponding nodes in data structure 104. For example, to decode the IE value 10 from the received message, the decoder accesses cache 500 to locate the key value for the node in data structure 104 corresponding to IE value 10. In this example, the key value for IE 10 is key1, which can be used by the decoder to directly access the corresponding node in data structure 104. It should be noted that when cache 500 is used, message information elements in data structure 500 may or may not be reordered according to the test configuration data.

Continuing with the code examples above, the following structure illustrates key values assigned to the IEs most frequently used messages in a particular test configuration.

```
struct IE *rrcpdcpprim_r9_lte_primitive_list[10] = {          {(key1,5 bits), (key2,5 bits) .... }
    /* LOCAL IE */ rrcpdcpprim_r9_lte_Sec_Mode_Status,        // Priority 0 (3 times in the call flow) <key1>
    /* LOCAL IE */ rrcpdcpprim_r9_lte_Data_Ind_eNB,           // Priority 1 (2 times in the call flow) <key2>
    /* LOCAL IE */ rrcpdcpprim_r9_lte_Data_Ind_eNB_SM,        // Priority 2 (1 time in the call flow) <key3>
    /* LOCAL IE */ rrcpdcpprim_r9_lte_Data_Req_UE,
    /* LOCAL IE */ rrcpdcpprim_r9_lte_Data_Req_UE_SM,
    /* LOCAL IE */ rrcpdcpprim_r9_lte_Data_Req_eNB,
    /* LOCAL IE */ rrcpdcpprim_r9_lte_Data_Req_eNB_SM,
    /* LOCAL IE */ rrcpdcpprim_r9_lte_Data_Ind_UE,
    /* LOCAL IE */ rrcpdcpprim_r9_lte_Data_Ind_UE_SM,
    /* LOCAL IE */ rrcpdcpprim_r9_lte_Data_Ack,
};
```

In the structure listed above, IEs for the three messages known from the test configuration data to be present in the test are assigned key values that allow fast direct access to the corresponding message IEs. For example, the IE for the Sec_Mode_Status message is assigned a value of key1, the IE for the Data_Ind_eNB message is assigned a key value of key2, and the IE for the Data_Ind_eNB message is assigned a key value of key3. When a test is executed, rather than traversing the message blueprint data structure from branches from left to right to locate the IE for the message to be decoded, the key value directs the decoder to the IE corresponding to the message to be decoded.

Figure 6:
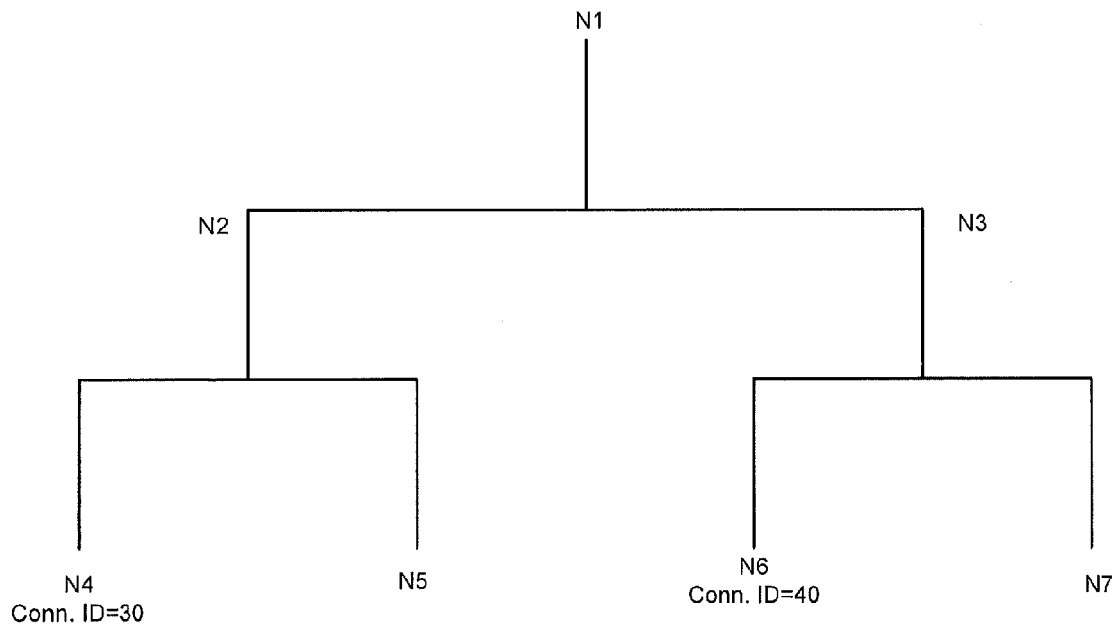
FIG. 6 is a tree diagram illustrating an exemplary decoded information element value cache formed after decoding a received message according to an embodiment of the subject matter described herein.

As stated above with respect to FIG. 2, decoder 108 may, after decoding messages, store decoded message parameter values in a decoded information element value cache 110 for faster access by applications. FIG. 6 illustrates an exemplary data structure for decoded information element value cache 110 according to an embodiment of the subject matter described herein. In FIG. 6, each node in decoded information element value cache 110 represents a decoded message parameter value from a received message. The following structure may be used for each node:

```
struct LExtract_St {
    struct rot_node item;       //Has the locid to look up the IE
    int parent;
    int child[MAX_CHILD];
    int child_index;
    char value[MAX_VALUE];
    int vlength;
} ROT_Array[MAX_IEs];
```

In the structure, each node includes a location ID value that is used to directly look up the decoded IE value. For example, a location ID of conn_ID may be used to look up the node where the connection ID from a received message is stored. The structure may also store parent node information that is used to distinguish between parameter values of the same type. For example, when an application, such as a network monitoring application, wants a connection ID, the application requests the connection ID from the decoder. In the example illustrated in FIG. 6, there are two different connection IDs one connection ID has parents N1 and N2 and the other connection ID has parents N1 and N3. The application request for a connection ID in this example would be of the format N1.N3.N6, if the connection ID=40 or N1.N2.N4, if the connection ID=30. For example, with N1.N3.N6, the location ID starts at N6 and traverses up the tree to N1, which is faster than traversing down the tree from N1 to N6. It is faster to traverse from a child to a parent when there are many children.

Figure 7:
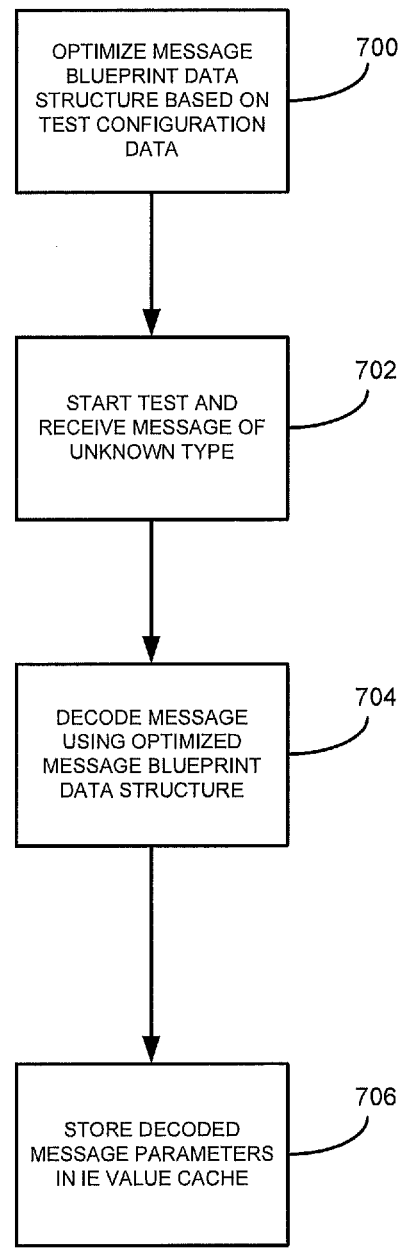
FIG. 7 is a flow chart illustrating message decoding according to an embodiment of the subject matter described herein.

FIG. 7 is a flow chart illustrating exemplary steps for decoding received messages using a test configuration data optimized message data structure according to an embodiment of the subject matter described herein. Referring to FIG. 7, in step 700, the message blueprint data structure is optimized based on test configuration data. As set forth above, optimizing data structure 104 may include rearranging information elements based on test configuration data and/or generating keys and the cache based on such data for faster access at run time. In step 702, the test is started, and a message of unknown type is received. In one example, the test may be an LTE UE attachment test where multiple UEs attach to an eNode-B under test. In step 704, the message is decoded using the message blueprint data structure. Decoding may be performed by matching the received message to a sequence of one or more IEs in the message blueprint data structure and extracting the IE parameter values from the message. In step 706, the decoded information element parameter values are stored in a cache for later access by applications.

It will be understood that various details of the subject matter described herein may be changed without departing from the scope of the subject matter described herein. Furthermore, the foregoing description is for the purpose of illustration only, and not for the purpose of limitation.

What is claimed is:

1. A system for test configuration optimized decoding of messages received from a device under test, the system comprising:
   a network equipment test device including:
      a memory;
      a message blueprint data structure embodied in the memory and including blueprint data usable to decode the messages;
      a message decoder embodied in the memory for receiving the messages from the device under test and decoding the messages by accessing the message blueprint data structure and matching information elements in the messages with information elements in the message blueprint data structure; and
      a message blueprint data structure configurator embodied in the memory for receiving, as input, test configuration data, and for configuring the message blueprint data structure for optimized decoding of the messages based on the test configuration data.

2. The system of claim 1 wherein the message blueprint data structure configurator is configured to reorder information elements in the message blueprint data structure based on relative frequencies of messages expected to occur in a test corresponding to the test configuration data.

3. The system of claim 1 wherein the message blueprint data structure configurator is configured to generate a cache of information elements expected to occur in a test corresponding to the test configuration data and keys to corresponding locations in the message blueprint data structure.

4. The system of claim 1 wherein the message decoder is configured to generate a cache of decoded values from a decoded message for access by applications, wherein the decoded values are stored in child nodes in the cache.

5. The system of claim 4 wherein each child node in the cache that stores a decoded value includes a back pointer to a parent node of the child node.

6. The system of claim 1 wherein the configurator is configured to optimize the message blueprint data structure in advance of execution of a test.

7. The system of claim 1 wherein the configurator is configured to optimize the message blueprint data structure during execution of a test based on changes in message types expected to be received during the execution of the test.

8. The system of claim 1 wherein the network equipment test device comprises a user equipment (UE) simulator configured to test an access network node.

9. The system of claim 8 wherein the UE simulator comprises a long term evolution (LTE) UE simulator and the access network node comprises an evolved Node B (e-Node B).

10. A method for test configuration optimized decoding of messages received from a device under test, the method comprising:

in a network equipment test device:
storing, in memory accessible by a processor, a message blueprint data structure including blueprint data usable to decode the messages;
decoding the messages received from the device under test by accessing the message blueprint data structure, matching information elements in the messages with information elements in the message blueprint data structure; and
configuring, prior to the decoding, the message blueprint data structure for optimized decoding of the messages based on test configuration data.

11. The method of claim 10 wherein configuring the message blueprint data structure includes reordering information elements in the message blueprint data structure based on relative frequencies of messages expected to occur in a test corresponding to the test configuration data.

12. The method of claim 11 wherein configuring the message blueprint data structure includes generating a cache of information elements expected to occur in a test corresponding to the test configuration and keys corresponding to information elements in the data structure.

13. The method of claim 10 comprising generating a cache of decoded information element values from a decoded message for access by applications, wherein the decoded values are stored in child nodes in the cache.

14. The method of claim 13 wherein each child node in the cache that stores a decoded value includes a back pointer to a parent node of the child node.

15. The method of claim 10 wherein configuring the message blueprint data structure includes configuring the message blueprint data structure in advance of execution of a test.

16. The method claim 10 wherein configuring the message blueprint data structure includes configuring the message blueprint data structure during execution of a test based on changes in message types expected to be received during the execution of the test.

17. The method of claim 10 wherein the network equipment test device comprises a user equipment (UE) simulator configured to test an access network node.

18. The method of claim 17 wherein the UE simulator comprises a long term evolution (LTE) UE simulator and the access network node comprises an evolved Node B (e-Node B).

19. A non-transitory computer readable medium having stored thereon executable instructions that when executed by the processor of a computer control the computer to perform steps comprising:
storing, in memory accessible by a processor, a message blueprint data structure including blueprint data usable to decode messages received from a device under test;
decoding the messages received from the device under test by accessing the message blueprint data structure, matching information elements in the messages with information elements in the message blueprint data structure; and
configuring, prior to the decoding, the message blueprint data structure for optimized decoding of the messages based on test configuration data.

* * * * *